Sept. 18, 1945.  E. E. STAHLY ET AL  2,385,237
HYDROCARBON POLYMERIZATION PROCESS
Filed Dec. 31, 1942
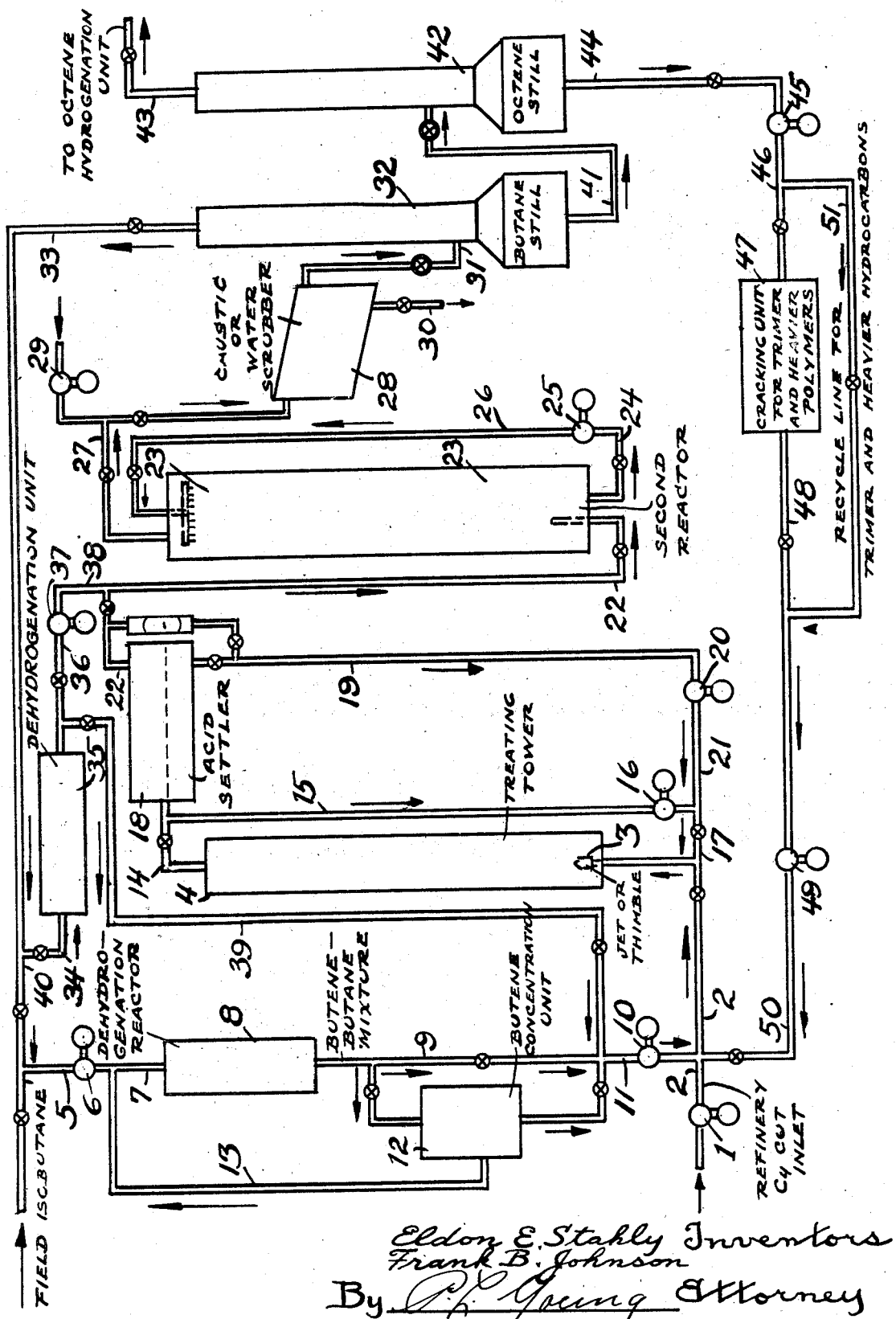
Eldon E. Stahly
Frank B. Johnson  Inventors
By ___ Young  Attorney

UNITED STATES PATENT OFFICE 2,385,237

HYDROCARBON POLYMERIZATION PROCESS

Eldon E. Stahly, Pittsburgh, Pa., and Frank B. Johnson, Baton Rouge, La., assignors to Standard Oil Development Company, a corporation of Delaware Application December 31, 1942, Serial No. 470,762

10 Claims. (Cl. 260—683.15)

The present invention relates to the production of petroleum products of the motor fuel range and particularly to a method of efficiently utilizing the various portions of a $C_4$ refinery cut in the production of olefin polymers.

It is well known that isobutylene portions of $C_4$ fractions obtained from cracked petroleum products have been submitted to contact polymerization processes for the production of diisobutylene and other isobutylene polymers which on hydrogenation form useful products of high octane number for blending in aviation fuels. It is also known that under proper contact conditions and with sufficiently long contact time in the presence of a catalyst, such as sulfuric acid, the isobutylene portion of a $C_4$ cut will react with a portion of the normal butylenes present to form copolymers of isobutylene and normal butylene and that such copolymers, after hydrogenation, are also useful as blending ingredients for aviation fuels and have octane numbers nearly equal to that of isooctane. By the term "copolymer" is to be understood the product which is obtained by the polymerization of a mixture of two or more polymerizable substances of different molecular structure.

It has been found, in accordance with the present invention, that not only isobutylene itself but also the normally liquid polymers of isobutylene, chiefly diisobutylene and triisobutylene, may also be reacted with the normal butylenes in the presence of a polymerization catalyst, such as sulfuric acid, to form products which are similar in structure to copolymers of isobutylene and normal butylenes and which may be hydrogenated to form high octane number blending ingredients for aviation fuels. These products will be referred to hereinafter in the specification and claims as if they were identical with copolymers of isobutylene and normal butylene. Such reactions have useful applications in the processing of certain refinery products, such as a $C_4$ cut obtained from cracked products, to obtain the maximum yield of polymerized products useful in aviation fuels, as will be fully set forth hereinafter. When sulfuic acid is used as the catalyst, it is preferably of about 60% to about 75% strength; and the reaction is preferably conducted at about 150° to about 250° F., and under sufficient pressure to maintain the $C_4$ hydrocarbons in liquid phase. Other polymerization catalysts may be employed, e. g., concentrated phosphoric acid. The reactivity of diisobutylene with normal butylenes in forming a codimer of normal butylene and isobutylene is illustrated in the following example.

EXAMPLE

A series of runs were conducted in a single packed reaction tower with continuous acid spraying, using as feed stock a partially polymerized $C_4$ cut. The same feed stock was fed to the reactor in each run, the only variables being the rate of feed, and therefore time of contact with the catalyst, and the total length of run. The analyses were made of samples of the total product from each run. The data relating to these runs, the reaction conditions and analyses of the feed stock and of the products obtained in each run are shown in the following table:

Table 1

| | Run A | Run B | Run C |
|---|---|---|---|
| $H_2SO_4$ weight percent | 60 | | |
| Press., lbs. gauge | 400 | | |
| Temp., ° F | 225 | | |
| Continuous phase | Hydrocarbon | | |
| Recycle | Acid only | | |
| Recycle ratio | 1/1 to 4/1 for recycle/feed | | |
| Length of run, hours | 48 | 60 | 72 |
| Contact time, minutes | 36 | 105 | 130 |
| Feed, vol. percent: | | | |
| Percent iso-$C_4H_8$ | 1.2 | | |
| Percent n-$C_4H_8$ | 15.6 | | |
| Percent diisobutylene | 3.9 | | |
| Percent codimer (other octenes) | 4.6 | | |
| Percent $C_{12}$ and higher polymers | 3.1 | | |
| Percent butanes | 71.6 | | |
| Total hydrocarbon product analysis, vol. percent: | | | |
| Percent iso-$C_4H_8$ | 0.4 | 0.3 | 0.3 |
| Percent n-$C_4H_8$ | 13.4 | 12.5 | 11.6 |
| Percent diisobutylene | 2.1 | 0.9 | 0.8 |
| Percent codimer (other octenes) | 7.9 | 9.2 | 9.9 |
| Percent $C_{12}$ and higher polymers | 4.1 | 4.7 | 5.2 |
| Percent butanes | 72.1 | 72.4 | 72.2 |
| Wt. percent "$C_4$-free" polymer based on "$C_4$ unsats. plus polymer" | 56 | 59 | 63 |
| Percent reduction of n-$C_4H_8$ | 11 | 15 | 20 |
| Debutanized polymer: | | | |
| Wt. percent diisobutylene | 15 | 6 | 5 |
| Wt. percent other octenes | 56 | 62 | 62 |
| Wt. percent trimer and heavier hydrocarbons | 29 | 32 | 33 |

It is evident from the data of the above example, in which the quantities of diisobutylene and normal butylene in the feed have been reduced in the various runs and the quantity of codimer correspondingly increased, that the diisobutylene and normal butylene have reacted to form the codimer and that increased contact time favors such reaction.

The method of the present invention, according to which diisobutylene and other normally liquid polymers of isobutylene may be reacted with normal butylenes to form a codimer, makes possible not only a more complete utilization of the normal butylene present in a $C_4$ refinery cut in the production of codimer than has heretofore been realized, but also a practical utilization of the butane ingredient after separation of the same from the polymer products and dehydrogenating to form normal butylenes, which may then be reacted with the diisobutylene and higher polymers of isobutylene which have been formed along with the codimer in the first stage of the process. In such an application of the invention a refinery $C_4$ cut, or other $C_4$ aliphatic hydrocarbon mixture containing substantial amounts of normal butylene as well as butane, is dispersed in a tower containing 60%–75% sulfuric acid at a temperature of about 150°–250° F. under sufficient pressure to maintain the $C_4$ hydrocarbons in liquid phase. The $C_4$ feed is mixed with additional quantities of isobutylene, which may be conveniently obtained by the dehydrogenation of field isobutane, the amount of such added isobutylene being such as to give a volume ratio of isobutylene to normal butylene greater than 1. This favors the utilization of normal butylenes by cross polymerizing with the isobutylene. A faster rate of isobutylene polymerization, however, results in the formation of diisobutylene while not all of the normal butylenes are used up. It has been found that a longer contact time with the acid (1 to 2 hours) results in the reaction of the diisobutylene formed with portions of the normal butylene present, and if an excess of normal butylenes is present, substantially all of the diisobutylene will thus be used up in the formation of copolymer.

It is thus possible to utilize the spent butane obtained after separation from the final polymer products by dehydrogenation of the butane and feeding the normal butylene thus formed into a second tower to react with quantities of diisobutylene which may be present in the product of the first polymerization step to an extent more than necessary to react with the normal butylenes present in the original $C_4$ cut. Such excess of diisobutylenes may be obtained by introducing a sufficient amount of isobutylene into the $C_4$ cut from an extraneous source, as described above. It is preferable, in fact, to provide only a short contact time in the first polymerization zone to provide only for the formation of normally liquid polymers of isobutylene while of course forming a substantial amount of copolymer at the same time; but the time of contact should be insufficient to form more than about 20% of $C_{12}$ and higher boiling polymers, based on the total weight of polymers formed. In the second reaction zone conditions are provided which are best suited for the reaction of the diisobutylene with normal butylenes; but here also the time of contact should be limited and should not be sufficient to form more than about 35% of $C_{12}$ and higher boiling polymers, based on the total weight of polymers in the product. The time required will vary with the type of reactor used. In general, when a packed tower and acid spray are used in both steps, the contact time in the first zone should be about one hour or less, and should be from two to three hours in the second zone; and when the feed is introduced by means of a jet into the bottom of an acid tower in both steps, the contact time should be 20 minutes or less in the first zone and 40 minutes or less in the second zone. If the $C_{12}$ and heavier polymers are recycled to the first reaction zone, somewhat higher percentages of such polymers than those specified may be tolerated without disadvantage.

In a preferred method of carrying out the present invention the $C_4$ cut is dispersed in a tower containing sulfuric acid of about 70% strength at 170° F. under 200 lbs./square inch pressure to maintain the $C_4$ hydrocarbons in the liquid phase. A more complete reaction in the tower is obtained by recycling the hydrocarbon and acid. The $C_4$ cut is mixed with $C_4$ olefins obtained by dehydrogenating field isobutane or a mixture of the same with a portion of the spent butane obtained by separation from the polymer product. Means are preferably provided for the concentration of the $C_4$ olefins and return of the unreacted butanes to the dehydrogenation unit. Such concentration of butenes may be accomplished, for example, by extraction with a selective solvent, such as sulfuric acid, sulfur dioxide, acetone or a solution of rubber or of a high molecular weight isobutylene polymer, or by distillation with or without the addition of a third substance to form an azeotrope. The amount of $C_4$ olefins thus added to the original $C_4$ refinery cut is preferably such as to give a volume ratio of isobutylene to normal butylene which is greater than 1 in the feed entering the first contact tower.

The rate of introduction of feed into the first tower, which may be a jet reactor or a packed tower, and the rate of recycle of the acid and hydrocarbon are adjusted to provide a contact time of one hour or less, while the mixture is being passed through the tower. After reaction, the hydrocarbon and acid are passed to a settler, where the acid separates as a bottom layer and is thence returned to the contact tower. The separated hydrocarbon layer is then mixed with n-butylenes obtained by dehydrogenation of spent butane obtained in the stabilization of the final product. The amount of the n-butylenes added should be sufficient, theoretically at least, to react with all of the diisobutylene present in the mixture. After introduction of the n-butylenes the entire mixture is introduced into the bottom of a second contact tower, where the same conditions of temperature, pressure, and acid strength may be used as in the first reactor, but it is more preferable to operate with a lead lined reactor at about 225° F. and under a pressure of about 400 lbs./square inch, and with an acid of 60%–65% strength. This second reactor is preferably packed with pieces of tile, carbon raschig rings, pumice, or other inert porous material, although a jet reactor may be used if desired. The acid is recycled from the bottom of this reactor back to the top, where it is sprayed down into the hydrocarbon mixture, which constitutes the continuous phase. By adjusting the rate of hydrocarbon flow so that about two to about three hours of contact is obtained, substantially all of the diisobutylene is converted to codimer. The most suitable time of contact is dependent somewhat on the type of agitation used in the reactor.

The hydrocarbon product from the second reactor is scrubbed in a caustic and water scrubber and then introduced into a stabilizer where the $C_4$ gases are removed overhead. This stabilizer operates under about 50 lbs./square inch pressure, 300°–325° F. bottom temperature and about 100° F. top temperature. The butane overhead contains a major proportion of n-butane with smaller amounts of isobutane and butylenes. These gases are then split, some going to a dehydrogenation stage preparatory to being introduced into the feed going to the second reactor, the remainder being passed on to the first dehydrogenation unit, where it is mixed with field isobutane and dehydrogenated to form butenes and isobutenes to be mixed with the original refinery $C_4$ cut. The spent butane stream is divided according to the amount of diisobutylene to be reacted in a second reactor, and the latter is dependent on the relative available amounts of isobutylene obtained from the dehydrogenation of the field isobutane and in the refinery $C_4$ cut.

The stabilized polymer, after removal of the $C_4$ gases, goes to a second still in which the octene fraction is separated overhead and sent to a hydrogenation unit, where the hydrogenation of the same results in the formation of a 96 to 98 octane number blending stock. The trimer and heavier polymers are taken as bottoms from the second still and recycled back to the $C_4$ feed line. This recycling of the trimer bottoms has been found advantageous in increasing the percentage of dimer and decreasing the percentage of trimer in the newly formed product. In case the trimer production exceeds the amount desired for recycling, it may be passed through a cracking step to produce butenes which may be blended with the feed to the first polymerization step.

It can be seen that by the present process a proper combination of dehydrogenation of $C_4$ saturates, recycle and/or cracking of trimer and polymerization will result in the final production of yields of polymer, including codimer, which approach the maximum.

A preferred form of apparatus for carrying out the process of the present invention will be described in connection with the accompanying drawing, which presents in schematic form the rearrangement of various units. The supply of refinery $C_4$ cut is introduced by means of pump 1 through line 2 and jet or thimble 3 into the first treating tower 4, where it is brought into contact with sulfuric acid of 70% strength under a pressure of about 200 lbs./square inch and at a temperature of 170° F. Additional quantities of isobutylene are supplied from a dehydrogenation unit, which consists of line 5 through which field isobutane and a portion of spent butane from the present process are introduced, pump 6, line 7, and dehydrogenation reactor 8, from which the mixed dehydrogenated products are removed through line 9, pump 10, and line 11 to join line 2; or the dehydrogenated products may be passed through a butene concentration unit 12 before reaching pump 10. From the unit 12 the unreacted butane may be recycled through line 13 back to the dehydrogenation reactor. The acid and hydrocarbon mixture in tower 4 is removed at the top through line 14 and a portion of the same recycled through line 15, pump 16, and line 17 back to the bottom of the tower. The remainder of the acid and hydrocarbon mixture is passed to settler 18, where the acid layer separates on standing and is removed through line 19, pump 20, and line 21 to be returned to tower 4. The hydrocarbon layer passes from settler 18 through line 22 to a second reactor 23, but before entering the reactor it is mixed with additional quantities of normal butylenes produced as hereinafter described in dehydrogenation unit 35. Tower 23 is preferably packed for treating the hydrocarbon mixture as a continuous phase, the acid being sprayed into the top of the tower. The acid used is of 60%-70% strength, the pressure from 200-500 lbs./square inch and the temperature 170°-250° F. The acid is withdrawn from the bottom of the tower through line 24 and reintroduced into the top of the tower by means of pump 25 and line 26, which provide a continuous acid recycle system.

From the top of tower 23 the hydrocarbon phase is removed through line 27 to a caustic or water scrubber 28, the caustic or water being introduced into line 27 by means of pump 29. The water or caustic is drained from scrubber 28 through line 30, and the treated hydrocarbon material is introduced through line 31 into stabilizer 32, from which the butane fraction is removed overhead by means of line 33. A portion of this butane is passed through line 34 to dehydrogenation unit 35 for producing normal butylenes, some of which are introduced through line 36, pump 37, and line 38 into the hydrocarbon mixture passing to the second reaction tower 23 through line 22. The amount of butane taken off for dehydrogenation in unit 35 is determined by the principles hereinbefore discussed. Careful control of the amount of normal butylene introduced into line 22 may be obtained by removing a portion of the same from dehydrogenation unit 35 through line 39, which joins line 9. The portion of spent butane not used for the dehydrogenation is passed on through line 40 to join the field isobutane supply entering the system through line 5.

The product which has been freed from butane in stabilizer 32 is passed through line 41 to a still 42, from which the desired octenes, consisting chiefly of the codimers of isobutylene and normal butylene, are removed overhead. Heavier polymers are removed as bottoms from still 42, passed by means of line 44, pump 45, and line 46 to a cracking unit 47, and from this the cracked products are reintroduced into feed line 2 by means of line 48, pump 49, and line 50. If no cracking of the heavier polymers is deemed necessary, these may be by-passed around cracking unit 47 by means of line 51.

The present invention is not to be considered as limited by any examples or specific embodiments herein described, which are given for purposes of illustration only, but is to be limited solely by the terms of the appended claims.

We claim:

1. A method of preparing an aliphatic hydrocarbon product of the motor fuel boiling range from a $C_4$ hydrocarbon mixture containing substantial quantities of both n-butylenes and isobutylene, the former being in substantial molecular excess, which comprises adding to the mixture a sufficient quantity of isobutylene to produce an isobutylene/n-butylene molecular ratio of at least 1 in the mixture, contacting the mixture so formed with a catalyst in a first reaction zone for a time not greater than 20 minutes so as to form substantial quantities of liquid polymers of isobutylene and codimers of n-butylene and isobutylene but less than about 20% of $C_{12}$ and higher boiling polymers, based on the total weight of the polymers formed, adding to the product thus formed an amount of n-butylene which will produce in the mixture a total quantity of n-butylenes which is theoretically sufficient to react with all the polymers of isobutylene and any unreacted isobutylene to form a codimer of n-butylene and isobutylene, contacting the mixture thus formed with a catalyst in a second reaction zone for a period of 2 to 3 hours without forming more than about 35% of $C_{12}$ and higher boiling polymers, based on the total weight of polymers formed, and separating the octene fraction from the final product.

2. A method according to claim 1 in which the C₄ hydrocarbon mixture is a C₄ cut obtained from a cracked petroleum product.

3. Method according to claim 1 in which the catalyst used in each reaction zone is sulfuric acid of about 60% to about 75% strength, in which the temperature in each reaction zone is maintained at about 150° to about 250° F., and in which sufficient pressure is maintained in each reaction zone to conduct the reaction in liquid phase.

4. A method of preparing an aliphatic hydrocarbon product of the motor fuel boiling range from a C₄ hydrocarbon mixture containing substantial quantities of both n-butylene and isobutylene, the former being in substantial molecular excess, which comprises adding to the mixture a sufficient quantity of isobutylene to produce an isobutylene/n-butylene molecular ratio of at least 1 in the mixture, introducing the mixture so formed by jet dispersion into a body of sulfuric acid catalyst of about 60% to about 75% strength at a temperature of about 150° to about 250° F. and under sufficient pressure to maintain a C₄ hydrocarbon liquid phase in the reactor, maintaining the contact of the hydrocarbon feed with the acid for not more than 20 minutes, separating the hydrocarbon product from the acid, adding to such product an amount of n-butylene which will produce in the mixture a total quantity of n-butylene which is equal to at least 2 mols per mol of diisobutylene present, contacting the mixture thus formed in a packed reaction tower with a fresh portion of sulfuric acid of about 60% to about 75% strength under temperature and pressure conditions similar to those maintained in the first reaction zone for a period of 2 to 3 hours, and separating the octene fraction from the final product.

5. The method of preparing an aliphatic hydrocarbon product of the motor fuel boiling range which comprises adding isobutylene to a C₄ cut obtained from a cracked petroleum product in sufficient amount to produce an isobutylene/n-butylene molecular ratio of at least 1 in the mixture, contacting the mixture so formed by jet dispersion in a first reaction zone with sulfuric acid of about 70% strength at a temperature of about 170° F. and under a pressure of about 200 lbs./square inch for a period of not more than about 20 minutes to form a product containing substantial quantities of both diisobutylene and n-butylene-isobutylene codimers, separating the acid from such product, adding to such product an amount of n-butylene which is sufficient to produce a total quantity of n-butylenes in the mixture which is equal to at least 2 mols per mol of the diisobutylene present, contacting the mixture thus formed in a second reaction zone consisting of a packed reactor with sulfuric acid of about 60% to about 65% strength at a temperature of about 225° F. and under a pressure of about 400 lbs./square inch for a period of 2 to 3 hours, and separating the octene fraction from the final product.

6. A method according to claim 5 in which the said second reaction zone consists of a lead lined reactor packed with porous material and in which the acid is recycled from the bottom of the said reactor back to the top and sprayed downwardly into the hydrocarbon mixture, which constitutes a continuous phase.

7. A method according to claim 5 in which unreacted butane is supplied from the final product and at least a portion of such unreacted butane is dehydrogenated to supply n-butylenes for mixing with the hydrocarbon product from the first reaction zone before being introduced into the second reaction zone.

8. A method according to claim 5 in which the C₁₂ and heavier polymers are separated from the octene product obtained in the second reaction zone and recirculated to the first reaction zone.

9. The method of preparing a motor fuel product which comprises preparing an octene fraction according to the method of claim 1 and hydrogenating the same.

10. Method according to claim 4 in which the contact between the catalyst and hydrocarbon feed in each zone is achieved in a packed reaction tower.

ELDON E. STAHLY.
FRANK B. JOHNSON.